(No Model.)

H. HUBBARD.
APPARATUS FOR FILTERING OIL.

No. 541,439. Patented June 18, 1895.

WITNESSES:
C. B. Hunter
S. B. Lewis

INVENTOR
Henry Hubbard
BY
O. D. Lewis
ATTORNEY.

UNITED STATES PATENT OFFICE.

HENRY HUBBARD, OF ALLEGHENY, PENNSYLVANIA.

APPARATUS FOR FILTERING OIL.

SPECIFICATION forming part of Letters Patent No. 541,439, dated June 18, 1895.

Application filed July 5, 1893. Serial No. 479,578. (No model.)

*To all whom it may concern:*

Be it known that I, HENRY HUBBARD, a citizen of the United States, residing at Allegheny, in the county of Allegheny and State of Pennsylvania, have invented certain new and useful Improvements in Apparatus for Filtering Oil; and I do hereby declare the following to be a full, clear, and exact description of the invention, such as will enable others skilled in the art to which it pertains to make and use the same, reference being had to the accompanying drawings, which form a part of this specification.

My invention relates to an improved apparatus for filtering oil; and consists in certain details of construction and combination of parts as will be fully described hereinafter.

Figure 2:
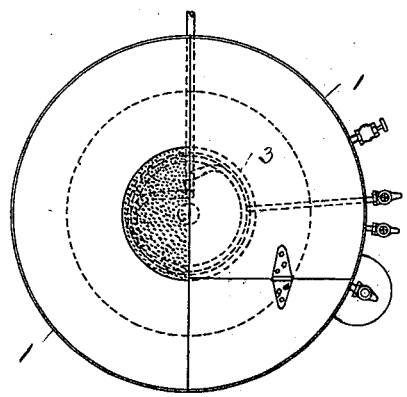
Figure 5:
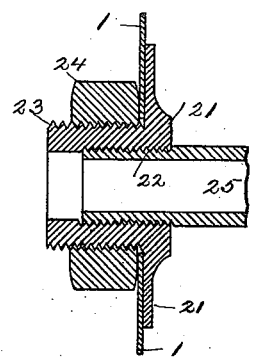
Figures 1, 3:
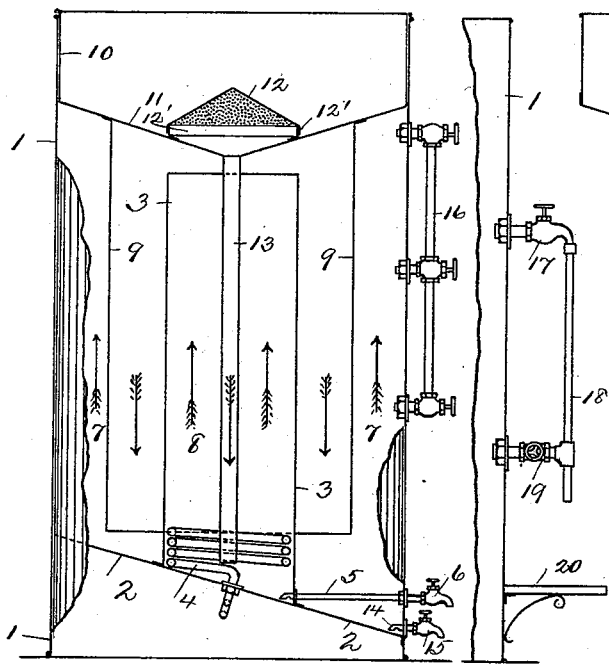
Figure 4:
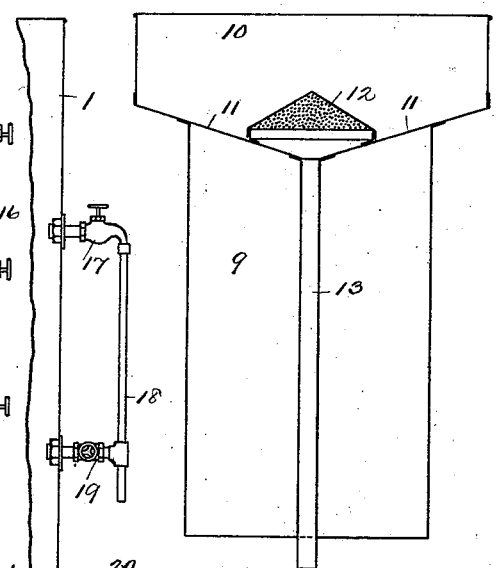

In the accompanying drawings, Figure 1 is a side sectional elevation of my improved apparatus for filtering oil, which is constructed in accordance with my invention. Fig. 2 is a plan view of the same. Fig. 3 is a side elevation of a portion of the apparatus, showing the connected outlet-cocks. Fig. 4 is a side elevation of the removable top and its attached portions. Fig. 5 is a sectional elevation of the connection of the several pipes with the apparatus.

To put my invention into practice, I provide a cylindrical vessel 1 of a suitable size and form of construction, and provide the same with a bottom 2 arranged at an angle of about fifteen degrees for the purpose of draining the contents of the filter toward one point, at which an outlet pipe 14 is arranged provided with a cock 15. Attached to this sloping bottom 2, and centrally located within the shell is a cylindrical chamber 8 arranged in a vertical position to leave an annular space between its walls 3, and those of the outside shell 1. This inner chamber 8 is attached to the bottom 2 in a manner that will prevent leakage, and is fitted at the lowest point with a drain pipe 5 which projects through the outer shell 1, and is fitted with a cock 6 to regulate and control the fluid passing through the same. Arranged within this inner chamber 8 is a steam heating coil 4, for the purpose of thinning the contents of the filter, and aiding the operation. Arranged in the mouth of the vessel 1 is a receiving pan 10, provided with an inverted conical bottom 11, and a connected pipe 13, which extends downward within a short distance of the sloping bottom 2. Attached to the conical bottom 11 over the mouth of the pipe 13 is an annular ring 12' having placed on its top a conical shaped wire screen 12 for the purpose of excluding any large particles of foreign substance from the pipe 13 and also to be self cleaning by the action of the oil striking the upper end and flowing down the sides. Attached to the outer vessel 1 (see Fig. 3) at different levels are two cocks 17 and 19 for drawing the filtered oil from the apparatus. These cocks are connected together by a pipe 18 the free end of which is arranged above a shelf 20 attached to the side of the filter.

Suitable gages provided with transparent tubes 16 are attached to the side of the filter, by means of which the height of the oil in the apparatus may be seen by the operator. Each pipe connection made with the outside shell and other parts of the apparatus is constructed and arranged in a manner shown at Fig. 5 on the drawings, which consists in a flanged nipple 21, having an internal thread 22, and an external threaded portion 23. This portion 23 is fitted with a nut 24 arranged within the casing 1 which will render the joint or connection tight, and the pipe 25 attached by means of the internal thread 22.

The space between the inside chamber 8 and the outside casing 1 is divided by an annular partition 9 attached to the bottom of the pan 10, and reaching downward to a point within a short distance of the sloping bottom 2.

The oil to be filtered is placed in the pan 10 at the top, and passes through the wire screen 12 and pipe 13 into the inner chamber 8 and is heated by the steam coil 4. This inner chamber will gradually fill, and cause the surplus oil to run down the sides of the same until the outer chamber is filled. The oil is first filtered or settled in the inner chamber 8, and the clean, light oil, being on the top, will enter the outer chamber to be again filtered. The filtered oil may be drawn from the two different levels through the pipe 18 and the impurities removed from the two chambers through the drain pipes 5 and 14. The oil first enters the inner chamber 8 and travels in the direction indicated by the arrow at Fig. 1 of the drawings.

Having thus described my invention, what I claim, and desire to secure by Letters Patent, is—

A filter consisting of a casing or outer vessel having an inclined bottom sloping to one side thereof, a pan adapted to rest upon the upper edge of said casing or outer vessel and having an inverted conical bottom provided upon its under side with an annular partition, reaching down within a short distance of said inclined bottom, and with a screen-covered pipe depending from the vertex of said conical bottom also within a short distance of said inclined bottom, a central chamber connected at its lower end to said inclined bottom and receiving said pipe and itself arranged interiorly of said annular partition, and having its upper, open end arranged a little below said conical bottom, drain pipes, one connected with said central chamber at the lowest point of its bottom and the other connected to the chamber of the outer vessel or casing at the lowest point of its bottom, and means for drawing off the contents of said outer vessel or casing, substantially as set forth.

In testimony that I claim the foregoing I hereunto affix my signature this 17th day of June, A. D. 1893.

HENRY HUBBARD. [L. S.]

In presence of—
JOHN S. KENNEDY,
C. B. HUNTER.